(12) United States Patent
Chen et al.

(10) Patent No.: US 8,161,079 B2
(45) Date of Patent: Apr. 17, 2012

(54) ACQUISITION AND EXPANSION OF STORAGE AREA NETWORK INTEROPERATION RELATIONSHIPS

(75) Inventors: Doan Lam Chen, San Jose, CA (US); Michael Allan Nelsen, Longmont, CO (US); Vincent J. Rooney, Vail, AZ (US); Florence Hon Sheung Tang, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/872,535

(22) Filed: Oct. 15, 2007

(65) Prior Publication Data

US 2009/0100000 A1 Apr. 16, 2009

(51) Int. Cl.
*G06F 7/00* (2006.01)
(52) U.S. Cl. ........ 707/802; 707/959; 707/966; 709/213; 709/220
(58) Field of Classification Search .................. 707/802, 707/959, 966; 709/213, 220
See application file for complete search history.

(56) References Cited

U.S. PATENT DOCUMENTS

| | | | |
|---|---|---|---|
| 6,834,299 B1 | 12/2004 | Hamilton, II et al. | |
| 7,003,527 B1 | 2/2006 | Lavallee et al. | |
| 7,197,489 B1* | 3/2007 | Gauvin et al. | 707/1 |
| 7,506,336 B1* | 3/2009 | Ninan | 717/175 |
| 7,512,595 B1* | 3/2009 | McBride et al. | 707/3 |
| 2004/0034577 A1 | 2/2004 | Van Hoose et al. | |
| 2004/0199899 A1* | 10/2004 | Powers et al. | 717/120 |
| 2004/0205089 A1 | 10/2004 | Alon et al. | |
| 2005/0091353 A1 | 4/2005 | Gopisetty et al. | |
| 2005/0185597 A1* | 8/2005 | Le et al. | 370/254 |
| 2007/0038679 A1 | 2/2007 | Ramkumar et al. | |
| 2007/0067589 A1* | 3/2007 | Mishra et al. | 711/163 |
| 2007/0079097 A1 | 4/2007 | Karnowski et al. | |

OTHER PUBLICATIONS

R. Fileto, et al., "A Survey on Information Systems Interoperability", Technical Report# IC-03-030, Dec. 2003, pp. 1-47.
EPO Communication pursuant to Rules 161(1) and 162 EPC action dated May 28, 2010 for Application No. 08838618.0—2413 PCT/EP2008063775, Reference No. TUC920070094EP1.
Response dated Jun. 24, 2010 to EPO Communication pursuant to Rules 161(1) and 162 EPC action dated May 28, 2010 for Application No. 08838618.0—2413 PCT/EP2008063775, Reference No. TUC920070094EP1.
D. Agrawal et al., "Policy-Based Validation of SAN Configuration", Proceedings of the Fifth IEEE International Workshop on Policies for Distributed Systems and Networks (Policy'04), 2004, pp. 1-10.

* cited by examiner

*Primary Examiner* — Cheyne Ly
(74) *Attorney, Agent, or Firm* — Rabindranath Dutta; Konrad Raynes & Victor LLP

(57) ABSTRACT

A plurality of components of a storage area network is grouped into a plurality of component groups, wherein a component group includes one or more of the plurality of components of the storage area network. A group relationship data structure provides relationships among one or more of the plurality of component groups, wherein a relationship indicates a supported configuration of the storage area network.

20 Claims, 8 Drawing Sheets

ACQUISITION AND EXPANSION OF STORAGE AREA NETWORK INTEROPERATION RELATIONSHIPS

BACKGROUND

1. Field

The disclosure relates to a method, system, and article of manufacture for the acquisition and expansion of storage area network interoperation relationships.

2. Background

A storage area network, also referred to as a SAN, may be comprised of many components, such as, servers, clients, operating systems, storage devices, switches, host bus adapters, etc. Furthermore, components may be added or removed from such storage area networks. Certain components may not interoperate, i.e., function, with certain other components of the storage area network. For example, a server of type A may interoperate only with an operating system of type B but may not interoperate with an operating system of type C.

It may be desirable for certain users to be aware of the interoperation capabilities of the components that may be included in a storage area network. Maintenance of such storage area network interoperation capabilities may be complex, error prone and labor intensive. Numerous combinations of storage area network components are possible, wherein configuration exceptions and anomalies may occur.

Certain mechanisms may capture and document the interoperation capabilities among elements of a storage area network manually. For example, in certain solutions, supported configurations of components in a storage area network may be maintained in an online or printed manual, with many indications of exceptions being indicated in footnotes to the supported configurations.

SUMMARY OF THE PREFERRED EMBODIMENTS

Provided are a method, system, and article of manufacture wherein a plurality of components of a storage area network is grouped into a plurality of component groups, wherein a component group includes one or more of the plurality of components of the storage area network. A group relationship data structure provides relationships among one or more of the plurality of component groups, wherein a relationship indicates a supported configuration of the storage area network.

In additional embodiments, the relationships among the one or more of the plurality of components groups are fewer in number in comparison to all supported combinations of the plurality of components in the storage area network.

In further embodiments entries are stored in a storage area network interoperability database, based on the relationships provided in the group relationship data structure and the plurality of component groups, wherein generating the storage area network interoperability database based on the relationships provided in the group relationship data structure and the plurality of component groups is performed faster in comparison to generating the storage area network interoperability database based on storing entries corresponding to all supported combinations of the plurality of components in the storage area network to the storage area network interoperability database. In yet further embodiments, a new component is added to the storage area network, wherein characteristics of the new component for interoperability with other components of the storage area network are indicated. A group relationship generation application modifies the component groups and the relationships in the group relationship data structure, wherein the modified relationships indicate supported configurations of the storage area network.

In still further embodiments, at least one exception to an interoperability of at least one component of the storage area network is indicated. A group relationship generation application modifies the component groups and the relationships in the group relationship data structure, wherein the modified relationships indicate supported configurations of the storage area network.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide for the grouping of various related components of a storage area network into groups, wherein the groups are referred to as component groups. The interoperation capabilities among components groups are maintained in a group relationship data structure by a group relationship generation application. The group relationship data structure and the component groups may be used to store entries in a storage area network interoperation database, wherein the storage area network interoperation database is used to respond to user or automated queries that request the interoperation capabilities of various individual components for the inclusion of components in the storage area network.

If supported configurations of components in the storage area network are generated without the formation of component groups, i.e., supported configurations are based on indicating the interoperability of individual components, then the loading time for entries of the storage area network interoperation database may be significantly more than that provided by certain embodiments in which the group relationship data structure and the component groups are used to load entries into the storage area network interoperation database.

Exemplary Embodiments

Figure 1:
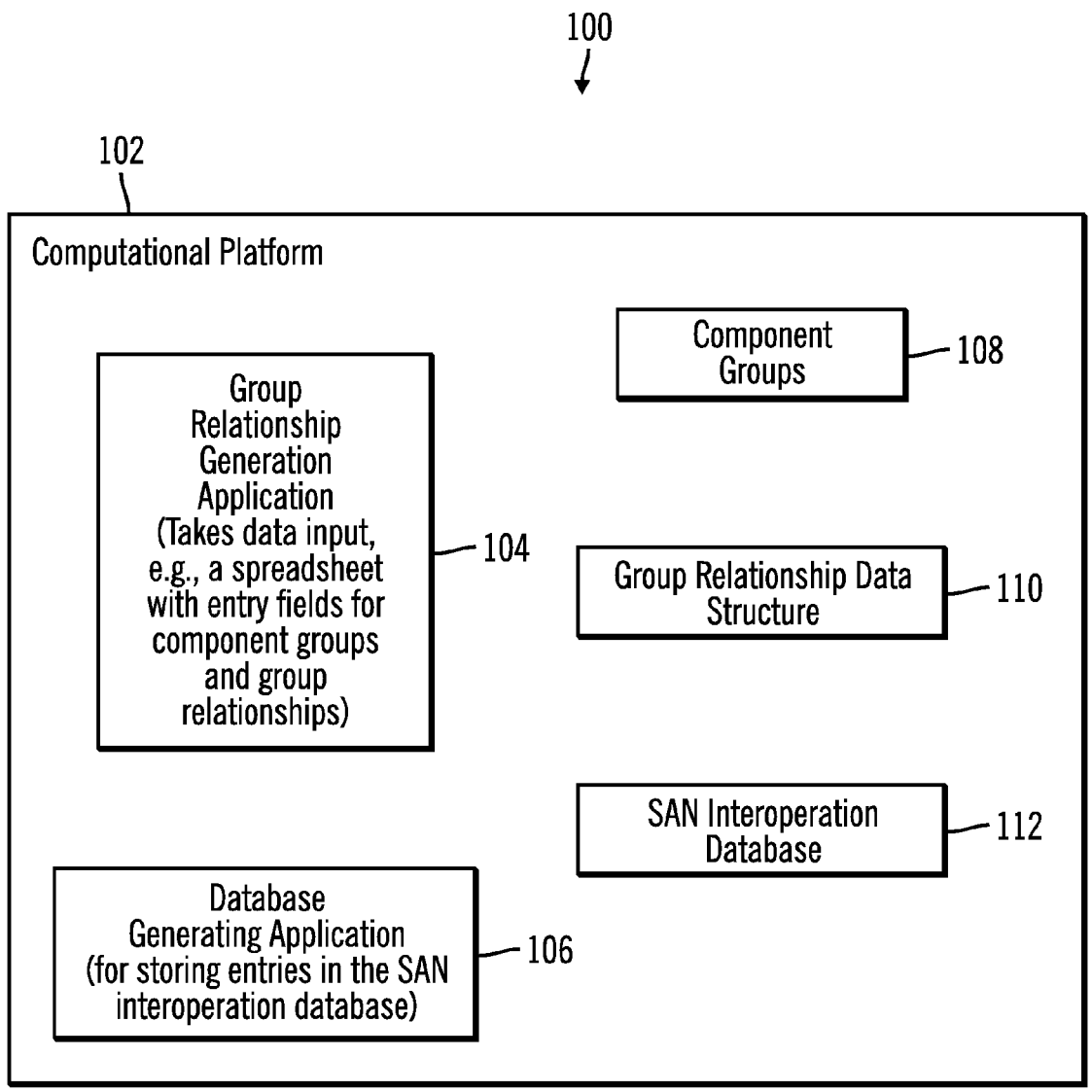
FIG. 1 illustrates a block diagram of a computational platform in a computing environment, in accordance with certain embodiments.

FIG. 1 illustrates a block diagram of a computing environment 100 that includes a computational platform 102. While FIG. 1 shows a single computational platform 102, in alternative embodiments a different number of computational platforms may be used to implement certain embodiments. For example, certain embodiments may be implemented in a distributed computing environment with a plurality of computational platforms collectively performing certain operations. The computational platform 102 may comprise any suitable computational platform, including those presently known in the art, such as, a server, a personal computer, a workstation, a mainframe, a midrange computer, a network appliance, a palm top computer, a telephony device, a blade computer, a hand held computer, etc.

The computational platform 102 includes a group relationship generation application 104 and a database generating application 106, that may also be referred to as a database generating/storing application because the database generating application 106 may store entries in a database to generate the database. In alternative embodiments, the operations performed by the group relationship generation application 104 and the database generating application 106 may be implemented by a single application or by more than two applications. The group relationship generation application 104 may be implemented differently in different exemplary embodiments, and in certain embodiments the group relationship generation application 104 may be a spreadsheet that takes inputs generated by a human expert based on the results of a series of tests that qualify SAN configurations.

The group relationship generation application 104 may group a set of related components into component groups 108 and may store the interoperation capabilities of the component groups in a group relationship data structure 110, wherein the group relationship data structure 110 may be implemented as a spreadsheet, a set of tuples, a text file, a database or via any other suitable data structure. The individual components included in the component groups 108 may be candidates for inclusion in a SAN.

The database generating application 106 may use the component groups 108 and the group relationship data structure 110 for creating, managing, entering and loading interoperation configurations into a SAN interoperation database 112, wherein the SAN interoperation database 112 may be used to respond to queries from a user, wherein the queries are related to the interoperation of components with a potential for inclusion in the SAN.

Therefore, FIG. 1 illustrates certain embodiments in which a group relationship generation application 104 stores groups of components in component groups 108 and generates the relationship between individual component groups for storage in the group relationship data structure 110. The database generating application 106 loads entries into the SAN interoperation database 112 based on information included in the component groups 108 and the group relationship data structure 100.

Figure 2:
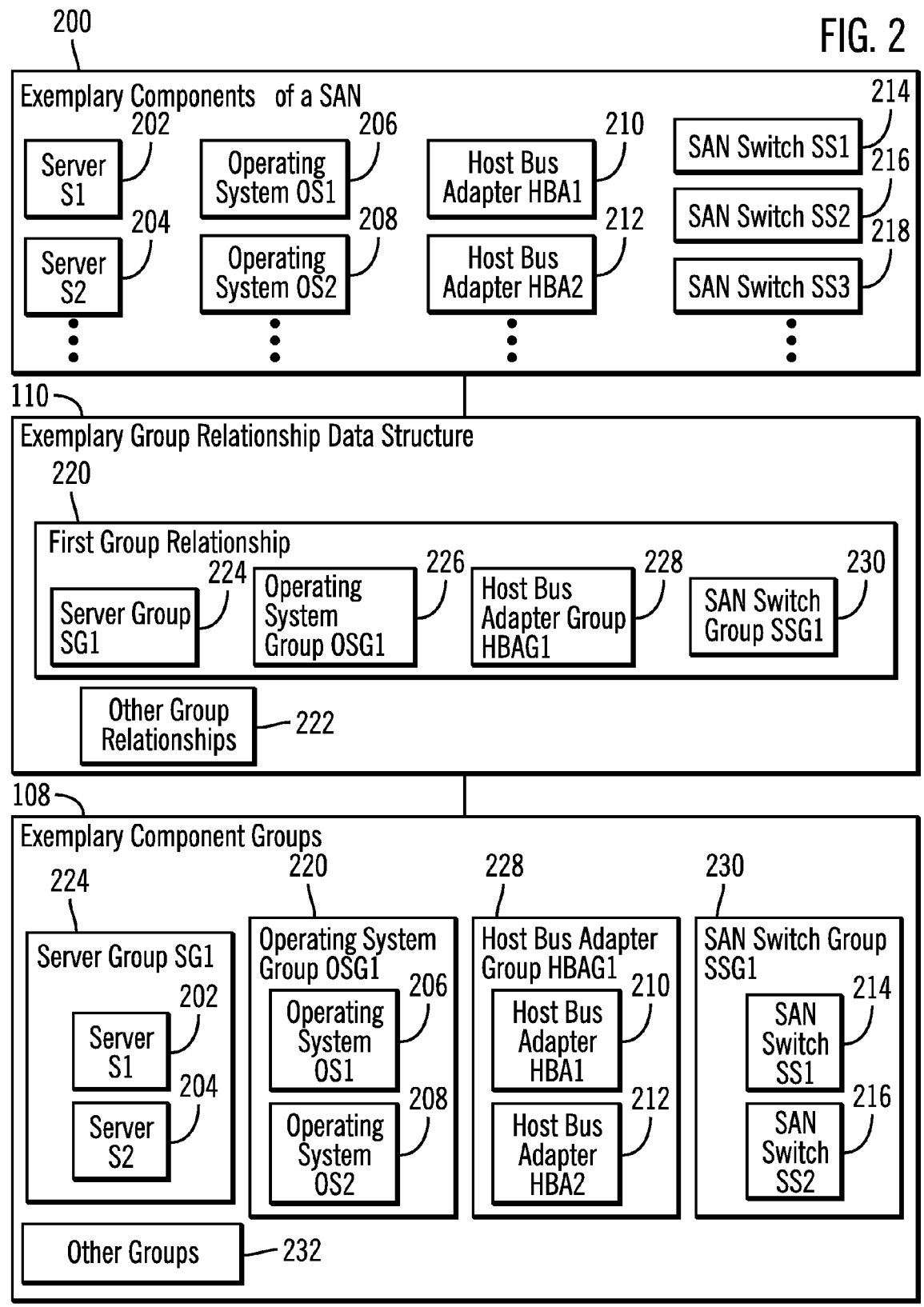
FIG. 2 illustrates exemplary components of a SAN, an exemplary group relationship data structure, and exemplary component groups, in accordance with certain embodiments.

FIG. 2 illustrates exemplary components 200 of a SAN, an exemplary group relationship data structure 110 (shown previously in FIG. 1), and exemplary component groups 108 (shown previously in FIG. 1), in accordance with certain embodiments.

The exemplary components 200 illustrated in FIG. 2 may include:

(i) Exemplary servers illustrated as server S1 202 and server S2 204;
(ii) Exemplary operating systems illustrated as operating system OS1 206 and operating system OS2 208;
(iii) Exemplary host bus adapters illustrated as host bus adapter HBA1 210 and host bus adapter HBA2 212; and
(iv) Exemplary SAN switches illustrated as SAN switch SS1 214, SAN switch SS2 216, and SAN switch SS3 218.

Other types of exemplary components may be found in alternative embodiments. Additionally the number of exemplary components for each type may be fewer or greater in number than the exemplary components 200 shown in FIG. 2.

The exemplary group relationship data structure 110 shown in FIG. 2 (and shown previously in FIG. 1) may include one or more exemplary group relationships, such as a first group relationship 220 and other group relationships 222. The exemplary first group relationship 220 may include a server group SG1 224, an operating system group OSG1 226, a host bus adapter group HBAG1 228 and a SAN switch group SSG1 230. The group relationship data structure 110 indicates that any component of server group SG1 224 may be coupled to any component of the operating system group OSG1 226, and may be coupled to any component of the host bus adapter group HBAG1 228, and may be coupled to any component of the SAN switch group SSG1 230 for interoperability. SAN configurations that include components in conformity with the first group relationship 220 may be supported by a vendor or support provider for the SAN.

FIG. 2 also illustrates the components in each of the component groups shown in the first group relationship 220 of the group relationship data structure 110. For example, server group SG1 includes server S1 202 and server S2 204, operating system group OSG1 226 includes operating system OS1 206 and operating system OS2 208, host bus adapter group HBAG1 228 includes host bus adapter HBA1 210 and host bus adapter HBA2 212, and SAN switch group SSG1 230 includes the SAN switch SS1 214 and SAN switch SS2 216. Other groups 232 may also be included in the exemplary component groups 108.

Figure 3:
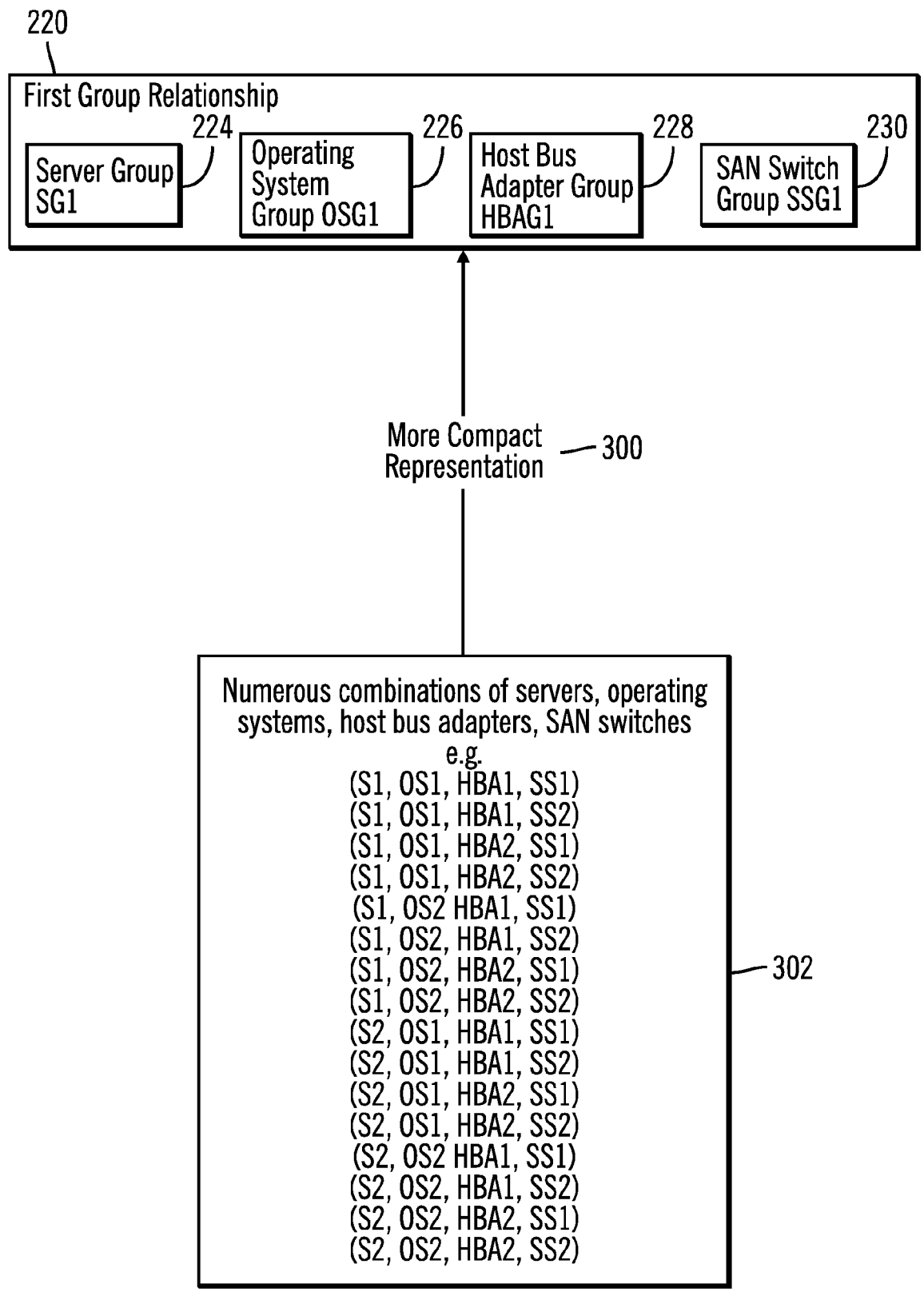
FIG. 3 illustrates how a more compact representation of interoperability relationships is obtained by maintaining group relationships, in accordance with certain embodiments.

FIG. 3 illustrates how a more compact representation 300 of interoperability relationships is obtained by maintaining group relationships 220 in accordance with certain embodiments.

It can be seen from FIG. 3 that all the possible combinations 302 of the components of the groups included in the first group relationship 220 greatly exceed the single relationship maintained among the server group SG1 224, operating system group OSG1 226, host bus adapter group HBAG1 228 and SAN switch group SSG1 230. Therefore, if the group relationship data structure 110 (shown previously in FIGS. 1 and 2) that includes the first group relationship 220 is used with the component groups 108 (shown previously in FIGS. 1 and 2) then the loading of entries into the SAN interoperation database 112 may be faster than if all possible combinations 302 of the components were used for the loading of entries into the SAN interoperation database 112. In certain exemplary systems, the combinations 302 may exceed a hundreds of thousands, millions, or potentially over tens of millions of entries and storing entries corresponding such a large number of combinations may be extremely time consuming in comparison to storing entries corresponding to the relationships 220, 222 (shown previously in FIG. 2) of the group relationship data structure 110 (shown previously in FIGS. 1 and 2) and the component groups 108 (shown previously in FIGS. 1 and 2).

Figure 4:
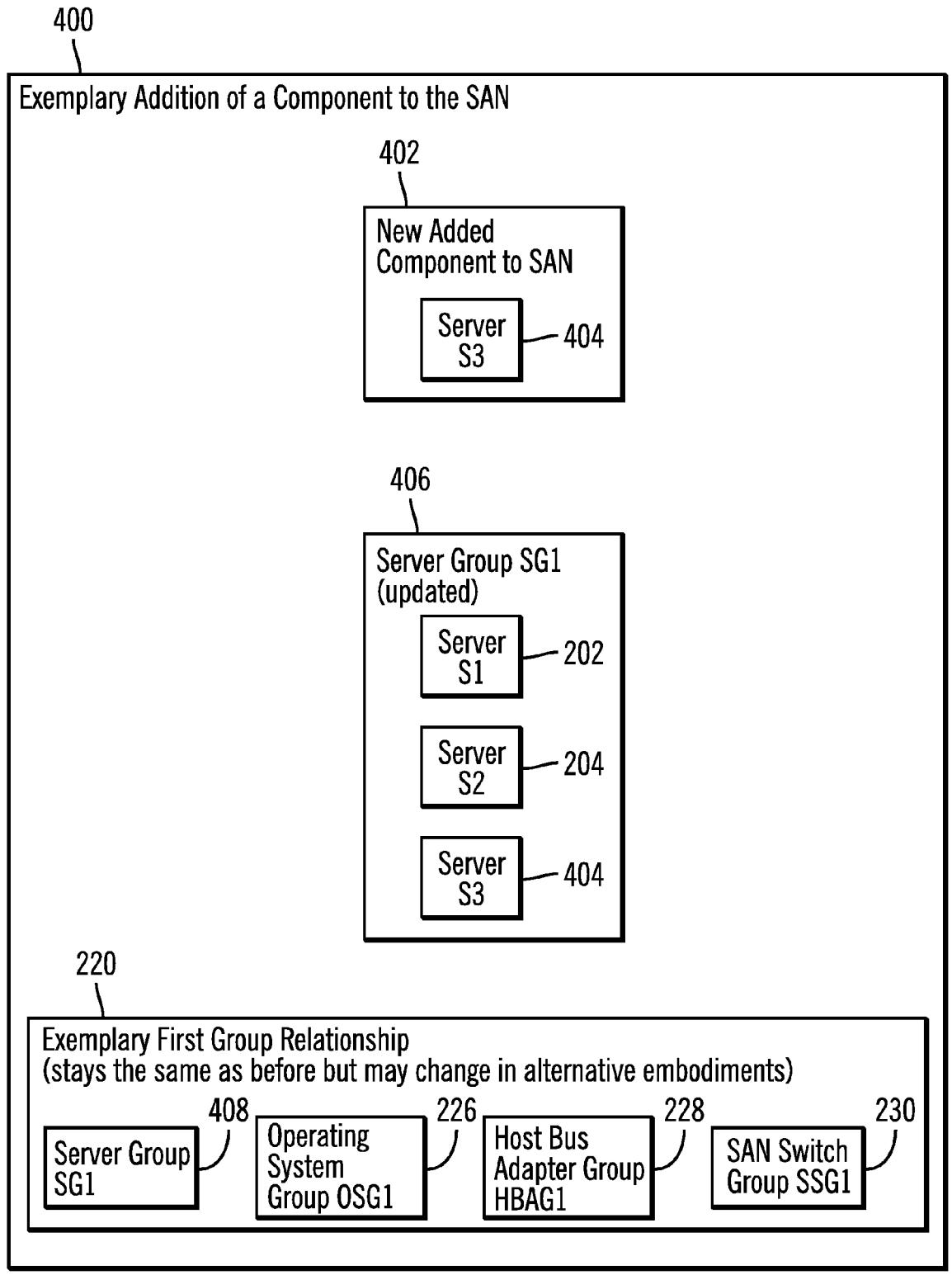
FIG. 4 illustrates the addition of a component to a SAN, in accordance with certain embodiments.

FIG. 4 illustrates the effect of the potential addition 400 of a new component to a SAN, in accordance with certain embodiments. In FIG. 4, the newly added component 402 is shown as server S3 404. In certain embodiments, when server S3 404 is added then the server group SG1 224 (shown in FIG. 2) that had two components server S1 202 and server S2 204 is updated to include the server S3 404 as shown in the updated server group 406. The exemplary first group relationship 220 does not undergo any change (although for ease of illustration the server group SG1 is referenced with reference numeral 408 in FIG. 4). Therefore, in certain embodiments the modifications needed to for adding new components to the SAN may be far less in comparison to the situation in which all valid combinations for interoperability among individual components is explicitly listed. Even in embodiments where the group relationships may have to be modified, the modifications may still be far less in comparison to the situation in which all valid combinations for interoperability among individual components are explicitly listed.

Figure 5:
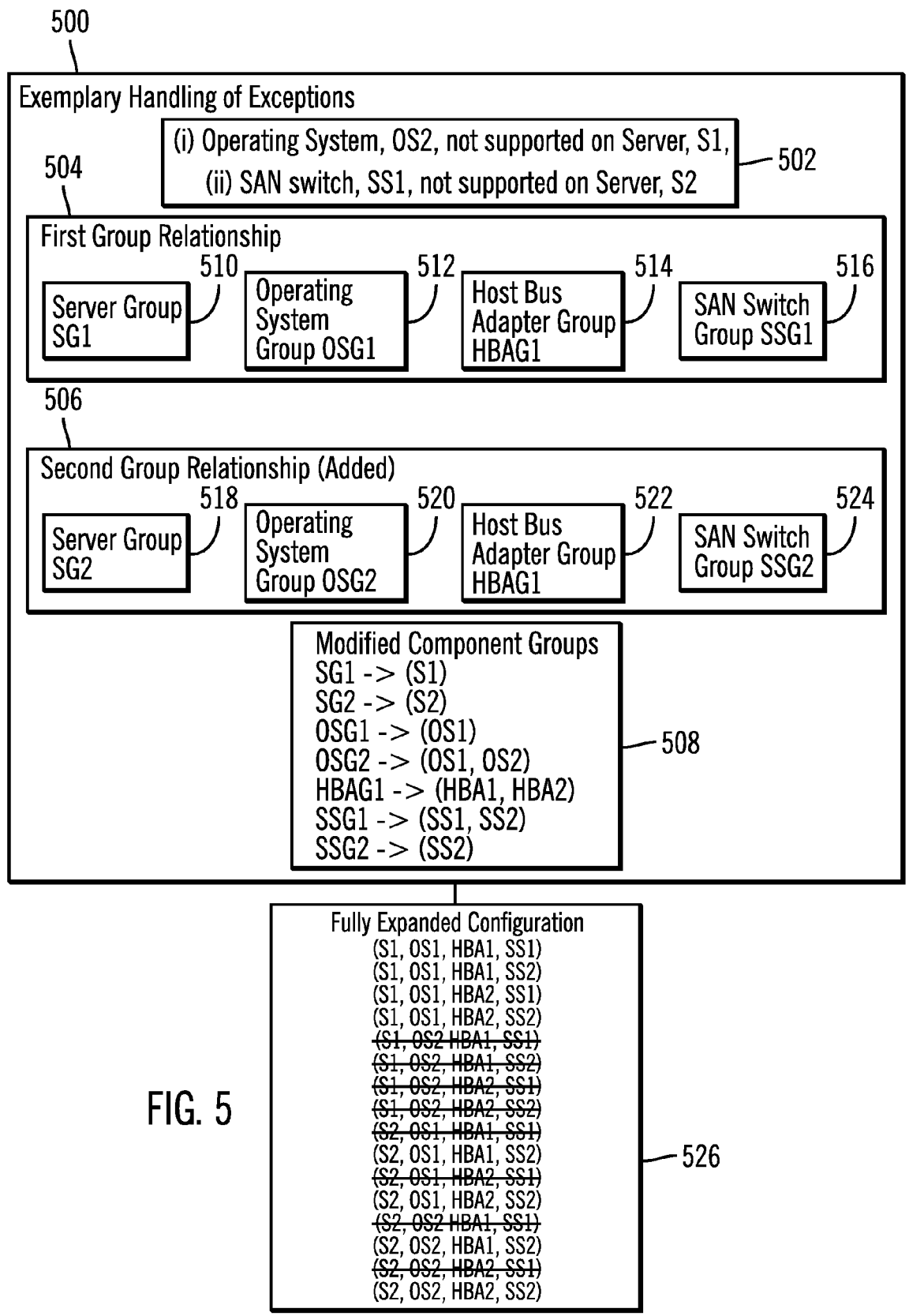
FIG. 5 illustrates the handling of exceptions to generally supported configurations, in accordance with certain embodiments.

FIG. 5 illustrates the handling of exceptions 500 to generally supported configurations, in accordance with certain embodiments. The exceptions 502 to generally supported configurations are shown as follows:

(i) Operating System, OS2 208 (shown previously in FIG. 2), is not supported on Server, S1 202 (shown previously in FIG. 2); and (ii) SAN switch, SS1 214 (shown previously in FIG. 2), is not supported on Server, S2 204 (shown previously in FIG. 2).

In certain embodiments shown in FIG. 5 the component groups and group relationships may need to be modified and/or extended. For the exemplary handling of exceptions 502 in the configuration shown in FIG. 2, the operations may include:

(i) no change to the first group relationship (represented by reference numeral 504 in FIG. 5 and by reference numeral 220 in FIG. 2), although the groups 510, 512, 514, 516 included in the first group relationship 504 of FIG. 5 may be different from that included in the first group relationship 220 of FIG. 2;

(ii) Addition of a second group relationship 506 with server group SG2 518, operating system group OSG2 520, host bus adapter group HBAG1 522 and SAN switch group SSG2 524;

(iii) Changes to the component groups to generate modified component groups 508, wherein the representations shown in the modified components group 508 indicate the component groups to the left (e.g. SG1, SG2, etc.) of the symbol "→" and the corresponding components enclosed within parenthesis to the right of the symbol "→". For example, component group OSG1 is shown as having component OS1 in the modified component groups 508.

The fully expanded configuration 526 corresponding to the group relationships 504, 506 are also shown in FIG. 5. Certain entries have been shown with a strikethrough mark in the fully expanded configuration 526 to indicate that these entries that were previously present in the SAN configuration shown in FIG. 2 are not possible in accordance with the exceptions 502.

Certain embodiments do not need footnotes or additional statements to indicate exceptions to generally supported configurations in the SAN. The group relationship entries 504, 506 are fewer than the fully expanded configuration 526 and therefore in certain embodiments fewer entries may need to be stored in the SAN interoperation database 112 in comparison to the situation in which the fully expanded configuration 526 is stored in the SAN interoperation database 112.

Figure 6:
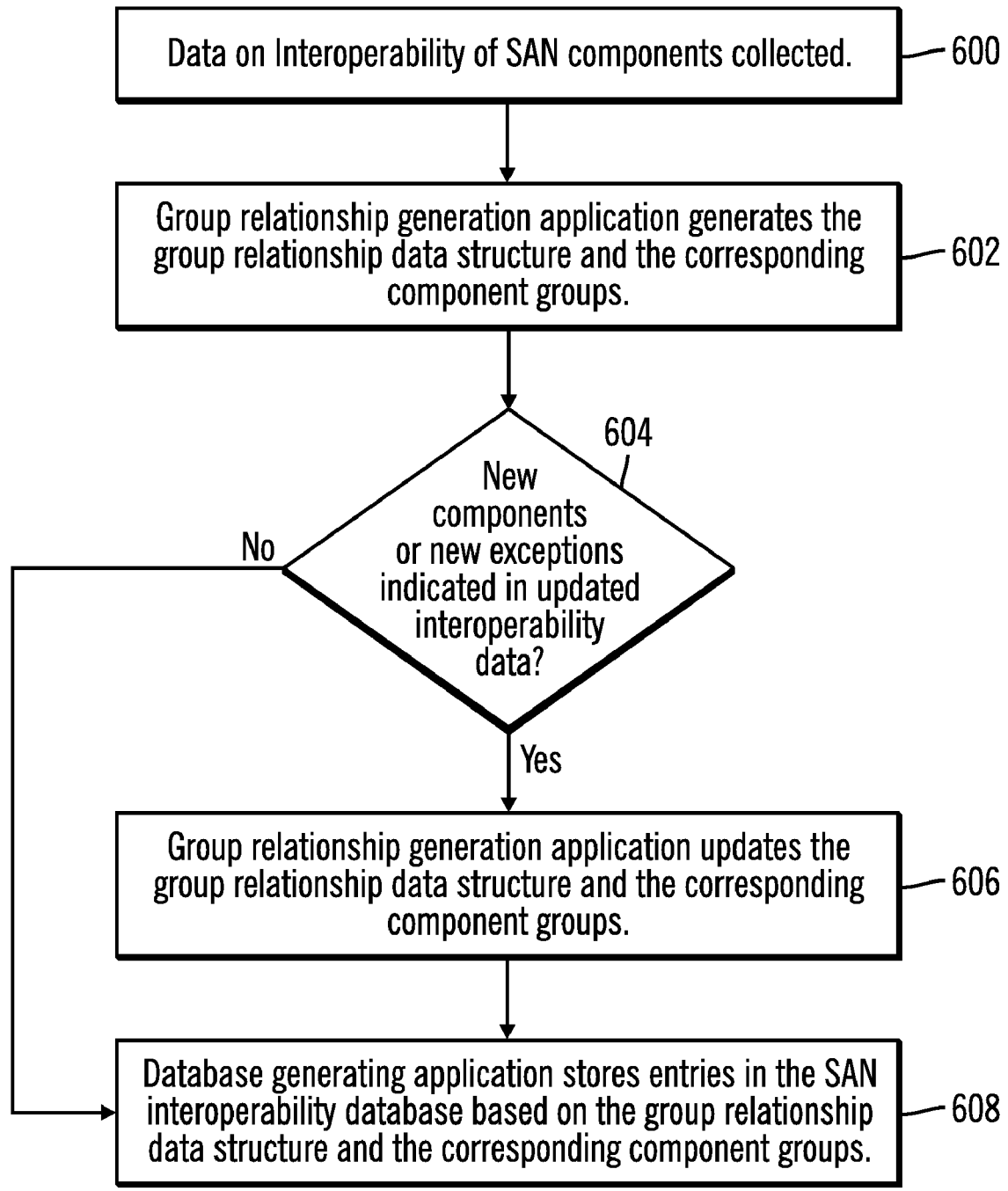
FIG. 6 illustrates first operations, in accordance with certain embodiments.

FIG. 6 illustrates first operations, in accordance with certain embodiments. The operations illustrated in FIG. 6 may be implemented by the group relationship generation application 104 and the database generating application 106 of the computational platform 102 in the computing environment 100.

Control starts at block 600 in which data on interoperability of SAN components is collected. The group relationship generation application 104 (shown previously in at least FIG. 1) generates (at block 602) the group relationship data structure 110 (shown previously in at least FIG. 1) and the corresponding component groups 108 (shown previously in at least FIG. 1).

Control proceeds to block 604, where a determination is made as to whether new components (e.g., new server S3 404 shown in FIG. 4) or new exceptions (e.g., exceptions 502 shown in FIG. 5) are indicated in updated interoperability data. If so, then the group relationship generation application 104 updates (at block 606) the group relationship data structure 110 and the corresponding component groups 108. Then the database generating/storing application 106 stores (at block 608) entries in the SAN interoperability database 112 based on the group relationship data structure 110 and the corresponding component groups 108. From block 604 control proceeds to block 608 if no new components or new exceptions are indicated in the updated interoperability data.

Figure 7:
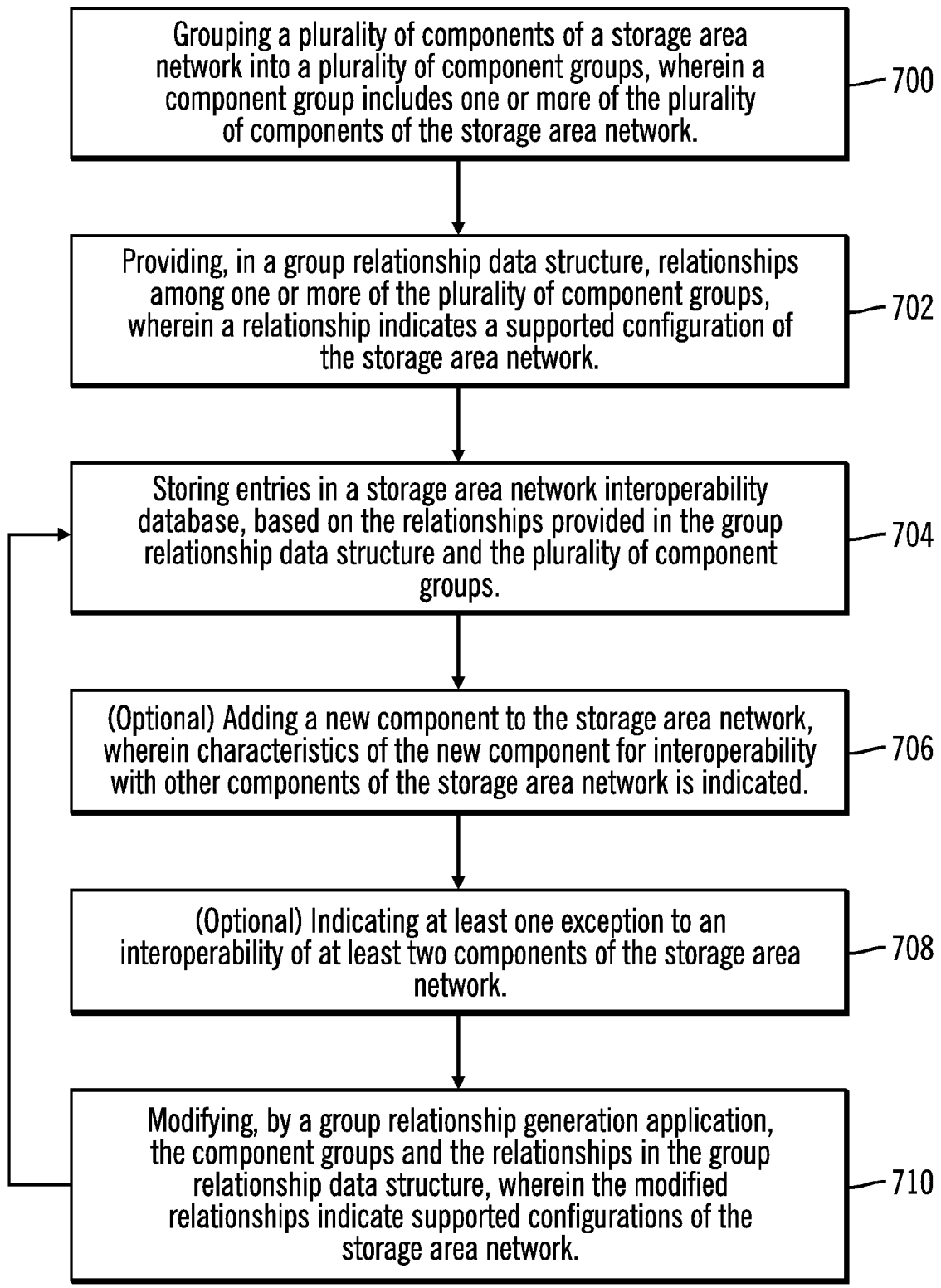
FIG. 7 illustrates second operations, in accordance with certain embodiments.

FIG. 7 illustrates second operations, in accordance with certain embodiments. The operations illustrated in FIG. 7 may be implemented by the group relationship generation application 104 and the database generating application 106 of the computational platform 102 in the computing environment 100.

Control starts at block 700, in which a grouping is performed of a plurality of components (e.g., exemplary components 200 of FIG. 2) of a storage area network into a plurality of component groups (e.g., exemplary component groups 108 of FIGS. 1 and 2), wherein a component group includes one or more of the plurality of components of the storage area network. A group relationship data structure 110 (shown previously in at least FIGS. 1 and 2) is generated to provide (at block 702) an indication of relationships (e.g., relationships 220, 222 shown in FIG. 2) among one or more of the plurality of component groups, wherein a relationship indicates a supported configuration of the storage area network.

Control proceeds to block 704, wherein entries are stored in a storage area network interoperability database 112 (shown previously in FIG. 1), based on the relationships provided in the group relationship data structure 110 and the plurality of component groups 108. An optional addition (at block 706) is made of a new component to the storage area network, wherein characteristics of the new component (e.g., exemplary server S3 404 shown previously in FIG. 4) for interoperability with other components of the storage area network are indicated. Additionally an optional indication is made (at block 708) of at least one exception (such as exceptions 502 shown previously in FIG. 5) to the interoperability of at least two components of the storage area network.

Control proceeds to block 710, wherein the group relationship generation application 104 (shown previously in at least FIG. 1) modifies the component groups 108 and the relationships in the group relationship data structure 110, and wherein the modified relationships indicate supported configurations of the storage area network. Control may return to block 704 from block 710.

Therefore, certain embodiments allow for the recognition and optimization for patterns where storage area configurations share common support characteristics. At the same time certain embodiments may efficiently provide for a number of exceptions in support characteristics. Furthermore, certain embodiments may group together all components that share similar support characteristics and may be able to create unique groups that have different support characteristics.

Certain embodiments allow for the collection and communication of the interoperability of various components in a storage area network, and may allow users to determine that a given configuration of components in a storage area network is supported by a vendor. Searching and loading of entries are reduced for entering into a database in comparison to situations where all potential combinations are stored in the database.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
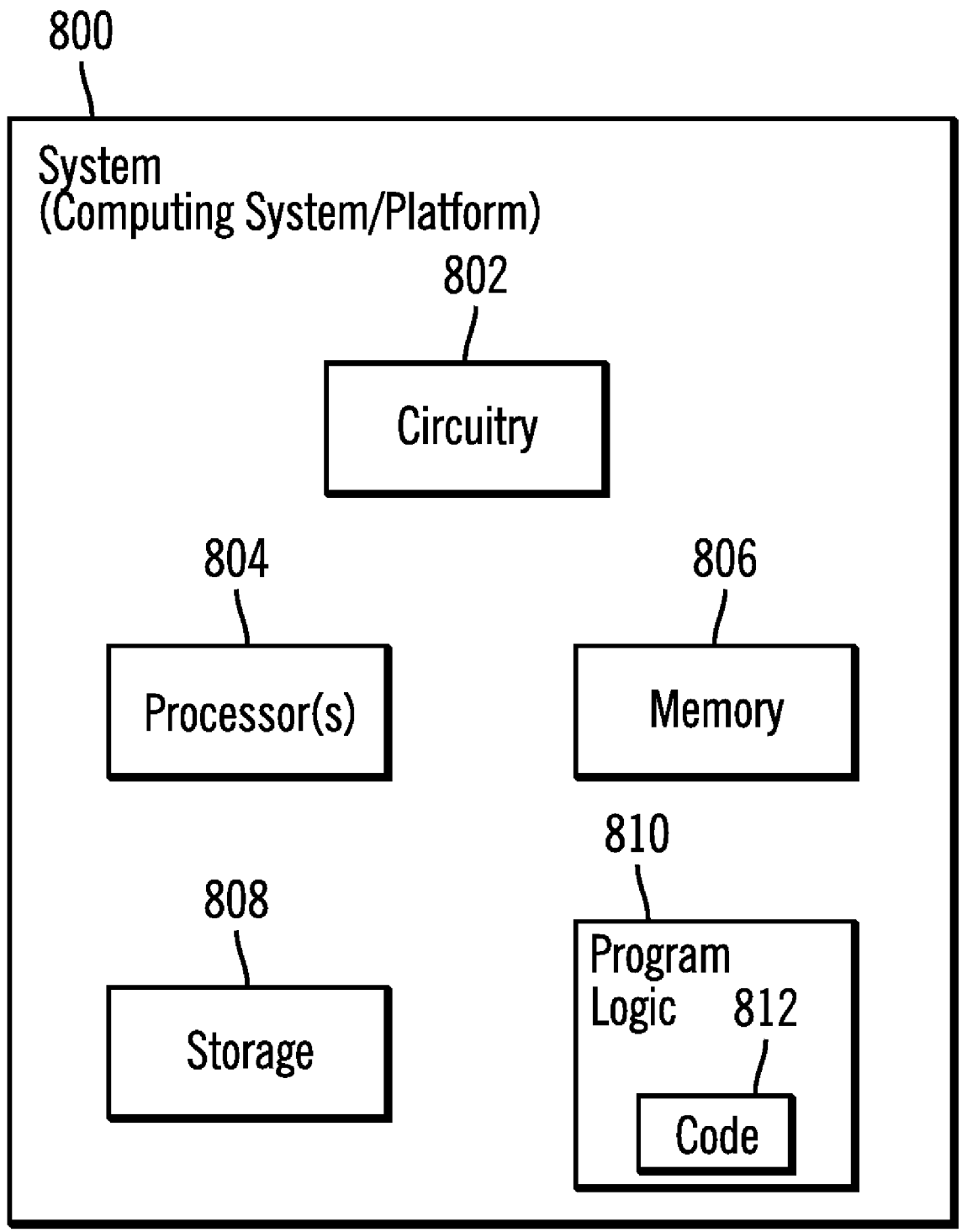
FIG. 8 illustrates a block diagram that shows certain elements that may be included in the computational platform of the computing environment, in accordance with certain embodiments.

FIG. 8 illustrates a block diagram that shows certain elements that may be included in the computational platform 102 in accordance with certain embodiments. One or more of the computational platform 102 either individually or collectively may also be referred to as a system, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising,
grouping, by a processor, a plurality of components of a storage area network into a plurality of component groups, wherein a component group includes one or more of the plurality of components of the storage area network, wherein the plurality of components include a first operating system, a second operating system, a first server, a second server, a first host bus adapter (HBA), a second HBA, a first storage area network (SAN) switch, a second SAN switch, wherein the plurality of component groups include a first server group, a first operating system group, a HBA group, and a first SAN switch group, and wherein the first server group includes the first server and the second server, the first operating system group includes the first operating system and the second operating system, the HBA group includes the first HBA and the second HBA, and the first SAN switch group includes the first SAN switch and the second SAN switch;
providing in a first group relationship data structure, relationships among one or more of the plurality of component groups, wherein a relationship indicates a supported configuration of the storage area network, wherein the first group relationship data structure includes the first server group, the first operating system group, the HBA group, and the first SAN switch group; and
in response to indicating that the second operating system is not supported on the first server, and that the first SAN switch is not supported on the second server, performing:
creating a second group relationship data structure to add to the provided first group relationship data structure, wherein the second group relationship data structure includes a second server group, a second operating system group, the HBA group, and a second SAN switch group;
modifying the plurality of component groups, wherein entries in the modified plurality of component groups are greater in number than entries in the plurality of component groups prior to the plurality of component groups being modified, and wherein the relationships among the one or more of the plurality of component groups are fewer in number in comparison to all supported combinations of the plurality of components in the storage area network reflected in a fully expanded configuration in which selected entries have been marked as incompatible configurations; and
indicating interoperation relationships among components via the first and second group relationship data structures and the modified component groups, wherein any maintenance of exception indications are avoided.

2. The method of claim 1, the method further comprising:
storing entries in a storage area network interoperability database, based on the relationships provided in the first group relationship data structure and the plurality of component groups, wherein generating the storage area network interoperability database based on the relationships provided in the first group relationship data structure and the plurality of component groups is performed faster in comparison to generating the storage area network interoperability database based on storing entries corresponding to all supported combinations of the plurality of components in the storage area network to the storage area network interoperability database.

3. The method of claim 1, further comprising:
adding a new component to the storage area network, wherein characteristics of the new component for interoperability with other components of the storage area network is indicated; and
in response to adding the new component, modifying, by a group relationship generation application, the component groups and the relationships in the first group relationship data structure, wherein the modified relationships indicate supported configurations of the storage area network subsequent to the adding of the new component.

4. A system comprising:
a memory; and
a processor coupled to the memory, wherein the processor performs operations, the operations comprising:
grouping a plurality of components of a storage area network into a plurality of component groups, wherein a component group includes one or more of the plurality of components of the storage area network, wherein the plurality of components include a first operating system, a second operating system, a first server, a second server, a first host bus adapter (HBA), a second HBA, a first storage area network (SAN) switch, a second SAN switch, wherein the plurality of component groups include a first server group, a first operating system group, a HBA group, and a first SAN switch group, and wherein the first server group includes the first server and the second server, the first operating system group includes the first operating system and the second operating system, the HBA group includes the first HBA and the second HBA, and the first SAN switch group includes the first SAN switch and the second SAN switch;

providing in a first group relationship data structure, relationships among one or more of the plurality of component groups, wherein a relationship indicates a supported configuration of the storage area network, wherein the first group relationship data structure includes the first server group, the first operating system group, the HBA group, and the first SAN switch group; and in response to indicating that the second operating system is not supported on the first server, and that the first SAN switch is not supported on the second server, performing:

creating a second group relationship data structure to add to the provided first group relationship data structure, wherein the second group relationship data structure includes a second server group, a second operating system group, the HBA group, and a second SAN switch group;

modifying the plurality of component groups, wherein entries in the modified plurality of component groups are greater in number than entries in the plurality of component groups prior to the plurality of component groups being modified, and wherein the relationships among the one or more of the plurality of component groups are fewer in number in comparison to all supported combinations of the plurality of components in the storage area network reflected in a fully expanded configuration in which selected entries have been marked as incompatible configurations; and indicating interoperation relationships among components via the first and second group relationship data structures and the modified component groups, wherein any maintenance of exception indications are avoided.

5. The system of claim 4, the operations further comprising:

storing entries in a storage area network interoperability database, based on the relationships provided in the first group relationship data structure and the plurality of component groups, wherein generating the storage area network interoperability database based on the relationships provided in the first group relationship data structure and the plurality of component groups is performed faster in comparison to generating the storage area network interoperability database based on storing entries corresponding to all supported combinations of the plurality of components in the storage area network to the storage area network interoperability database.

6. The system of claim 4, the operations further comprising:

adding a new component to the storage area network, wherein characteristics of the new component for interoperability with other components of the storage area network is indicated; and in response to adding the new component, modifying, by a group relationship generation application, the component groups and the relationships in the first group relationship data structure, wherein the modified relationships indicate supported configurations of the storage area network subsequent to the adding of the new component.

7. A computer readable storage medium, wherein code stored in the computer readable storage medium when executed by a processor performs operations, the operations comprising, grouping a plurality of components of a storage area network into a plurality of component groups, wherein a component group includes one or more of the plurality of components of the storage area network, wherein the plurality of components include a first operating system, a second operating system, a first server, a second server, a first host bus adapter (HBA), a second HBA, a first storage area network (SAN) switch, a second SAN switch, wherein the plurality of component groups include a first server group, a first operating system group, a HBA group, and a first SAN switch group, and wherein the first server group includes the first server and the second server, the first operating system group includes the first operating system and the second operating system, the HBA group includes the first HBA and the second HBA, and the first SAN switch group includes the first SAN switch and the second SAN switch;

providing in a first group relationship data structure, relationships among one or more of the plurality of component groups, wherein a relationship indicates a supported configuration of the storage area network, wherein the first group relationship data structure includes the first server group, the first operating system group, the HBA group, and the first SAN switch group; and in response to indicating that the second operating system is not supported on the first server, and that the first SAN switch is not supported on the second server, performing:

creating a second group relationship data structure to add to the provided first group relationship data structure, wherein the second group relationship data structure includes a second server group, a second operating system group, the HBA group, and a second SAN switch group;

modifying the plurality of component groups, wherein entries in the modified plurality of component groups are greater in number than entries in the plurality of component groups prior to the plurality of component groups being modified, and wherein the relationships among the one or more of the plurality of component groups are fewer in number in comparison to all supported combinations of the plurality of components in the storage area network reflected in a fully expanded configuration in which selected entries have been marked as incompatible configurations; and indicating interoperation relationships among components via the first and second group relationship data structures and the modified component groups, wherein any maintenance of exception indications are avoided.

8. The computer readable storage medium of claim 7, the operations further comprising:

storing entries in a storage area network interoperability database, based on the relationships provided in the first group relationship data structure and the plurality of component groups, wherein generating the storage area network interoperability database based on the relationships provided in the first group relationship data structure and the plurality of component groups is performed faster in comparison to generating the storage area network interoperability database based on storing entries corresponding to all supported combinations of the plurality of components in the storage area network to the storage area network interoperability database.

9. The computer readable storage medium of claim 7, the operations further comprising:
adding a new component to the storage area network, wherein characteristics of the new component for interoperability with other components of the storage area network is indicated; and
in response to adding the new component, modifying, by a group relationship generation application, the component groups and the relationships in the first group relationship data structure, wherein the modified relationships indicate supported configurations of the storage area network subsequent to the adding of the new component.

10. A method for deploying computing infrastructure, comprising integrating computer-readable code into a computing system, wherein the code in combination with the computing system is further capable of performing:
grouping, by a processor, a plurality of components of a storage area network into a plurality of component groups, wherein a component group includes one or more of the plurality of components of the storage area network, wherein the plurality of components include a first operating system, a second operating system, a first server, a second server, a first host bus adapter (HBA), a second HBA, a first storage area network (SAN) switch, a second SAN switch, wherein the plurality of component groups include a first server group, a first operating system group, a HBA group, and a first SAN switch group, and wherein the first server group includes the first server and the second server, the first operating system group includes the first operating system and the second operating system, the HBA group includes the first HBA and the second HBA, and the first SAN switch group includes the first SAN switch and the second SAN switch;
providing in a first group relationship data structure, relationships among one or more of the plurality of component groups, wherein a relationship indicates a supported configuration of the storage area network, wherein the first group relationship data structure includes the first server group, the first operating system group, the HBA group, and the first SAN switch group; and
in response to indicating that the second operating system is not supported on the first server, and that the first SAN switch is not supported on the second server, performing:
creating a second group relationship data structure to add to the provided first group relationship data structure, wherein the second group relationship data structure includes a second server group, a second operating system group, the HBA group, and a second SAN switch group;
modifying the plurality of component groups, wherein entries in the modified plurality of component groups are greater in number than entries in the plurality of component groups prior to the plurality of component groups being modified, and wherein the relationships among the one or more of the plurality of component groups are fewer in number in comparison to all supported combinations of the plurality of components in the storage area network reflected in a fully expanded configuration in which selected entries have been marked as incompatible configurations; and
indicating interoperation relationships among components via the first and second group relationship data structures and the modified component groups, wherein any maintenance of exception indications are avoided.

11. The method for deploying computing infrastructure of claim 10, wherein the code in combination with the computing system is further capable of performing:
storing entries in a storage area network interoperability database, based on the relationships provided in the first group relationship data structure and the plurality of component groups, wherein generating the storage area network interoperability database based on the relationships provided in the first group relationship data structure and the plurality of component groups is performed faster in comparison to generating the storage area network interoperability database based on storing entries corresponding to all supported combinations of the plurality of components in the storage area network to the storage area network interoperability database.

12. The method for deploying computing infrastructure of claim 10, wherein the code in combination with the computing system is further capable of performing:
adding a new component to the storage area network, wherein characteristics of the new component for interoperability with other components of the storage area network is indicated; and
in response to adding the new component, modifying, by a group relationship generation application, the component groups and the relationships in the first group relationship data structure, wherein the modified relationships indicate supported configurations of the storage area network subsequent to the adding of the new component.

13. The method of claim 1, wherein in the modified plurality of component groups:
a modified first server group includes the first server;
the second server group includes the second server;
a modified first operating system group includes the first operating system;
the second operating system group includes the first operating system and the second operating system;
the HBA group includes the first HBA and the second HBA;
the first SAN switch group includes the first SAN switch and the second SAN switch; and
the second SAN switch group includes the second SAN switch.

14. The system of claim 4, wherein in the modified plurality of component groups:
a modified first server group includes the first server;
the second server group includes the second server;
a modified first operating system group includes the first operating system;
the second operating system group includes the first operating system and the second operating system;
the HBA group includes the first HBA and the second HBA;
the first SAN switch group includes the first SAN switch and the second SAN switch; and
the second SAN switch group includes the second SAN switch.

15. The computer readable storage medium of claim 7, wherein in the modified plurality of component groups:
a modified first server group includes the first server;
the second server group includes the second server;

a modified first operating system group includes the first operating system;

the second operating system group includes the first operating system and the second operating system;

the HBA group includes the first HBA and the second HBA;

the first SAN switch group includes the first SAN switch and the second SAN switch; and the second SAN switch group includes the second SAN switch.

16. The method for deploying computing infrastructure of claim 10, wherein in the modified plurality of component groups:

a modified first server group includes the first server;

the second server group includes the second server;

a modified first operating system group includes the first operating system;

the second operating system group includes the first operating system and the second operating system;

the HBA group includes the first HBA and the second HBA;

the first SAN switch group includes the first SAN switch and the second SAN switch; and the second SAN switch group includes the second SAN switch.

17. The method of claim 1, wherein the fully expanded configuration shows all possible combinations of the plurality of components in a plurality of rows, wherein each row of the plurality of rows shows a possible combination, and wherein possible combinations that are incompatible configurations are marked.

18. The system of claim 4, wherein the fully expanded configuration shows all possible combinations of the plurality of components in a plurality of rows, wherein each row of the plurality of rows shows a possible combination, and wherein possible combinations that are incompatible configurations are marked.

19. The computer readable storage medium of claim 7, wherein the fully expanded configuration shows all possible combinations of the plurality of components in a plurality of rows, wherein each row of the plurality of rows shows a possible combination, and wherein possible combinations that are incompatible configurations are marked.

20. The method for deploying computing infrastructure of claim 10, wherein the fully expanded configuration shows all possible combinations of the plurality of components in a plurality of rows, wherein each row of the plurality of rows shows a possible combination, and wherein possible combinations that are incompatible configurations are marked.

* * * * *